(12) United States Patent
Naganna et al.

(10) Patent No.: US 12,039,273 B2
(45) Date of Patent: Jul. 16, 2024

(54) FEATURE VECTOR GENERATION FOR PROBABALISTIC MATCHING

(71) Applicant: International Business Machines Corporation, Armonk, NY (US)

(72) Inventors: Soma Shekar Naganna, Bangalore (IN); Abhishek Seth, Deoband (IN); Neeraj Ramkrishna Singh, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 516 days.

(21) Appl. No.: 16/942,925

(22) Filed: Jul. 30, 2020

(65) Prior Publication Data

US 2022/0036006 A1     Feb. 3, 2022

(51) Int. Cl.
*G06F 16/28* (2019.01)
*G06F 16/35* (2019.01)
*G06F 18/211* (2023.01)
*G06F 21/62* (2013.01)
(Continued)

(52) U.S. Cl.
CPC ............ *G06F 40/295* (2020.01); *G06F 16/35* (2019.01); *G06F 18/211* (2023.01); *G06F 21/6245* (2013.01); *G06F 40/30* (2020.01)

(58) Field of Classification Search
CPC ............... G06F 21/6245; G06F 16/288; G06F 16/9024; G06F 16/28; G06F 40/20; G06F 40/205; G06F 7/14; G06F 16/285; G06F 16/245; G06N 20/00; G06N 5/025;
(Continued)

(56) References Cited

U.S. PATENT DOCUMENTS

| 7,657,506 B2* | 2/2010 | Levin ..................... G06F 16/285 707/999.002 |
| 7,685,093 B1 | 3/2010 | Adams et al. |
| 7,698,268 B1 | 4/2010 | Adams et al. |

(Continued)

OTHER PUBLICATIONS

Disclosed Anonymously, "Mechanism for calculating regional input device probabilistic edit distance for use in log-likelihood based MDM record scoring", IP.com No. IPCOM000261445D, IP.com Electronic Publication Date: Mar. 3, 2020, ip.com, 5 pages.
(Continued)

*Primary Examiner* — Olujimi A Adesanya
(74) *Attorney, Agent, or Firm* — Daniel M. Yeates (57) ABSTRACT

A computer-implemented method increases the efficiency of matching records from two sources. The method includes identifying a first source and a second source wherein each of the sources include one or more records and each record includes one or more attributes. The method further includes determining, based on a corpus, the one or more attributes and generating, based on the attributes, a set of feature vectors which vectors represent the one or more attributes. The method includes comparing each record in the first source against each record in the second source. The method further includes generating, in response to the comparing, a link confidence. The method also includes linking, in response to the link confidence being above a linking threshold, the associated records. The method includes determining a first feature vector of the set of feature vectors used in the linking, and outputting a set of results.

20 Claims, 5 Drawing Sheets

(51) Int. Cl.
    *G06F 40/295* (2020.01)
    *G06F 40/30* (2020.01)

(58) Field of Classification Search
    CPC ............ G06N 5/022; G06N 3/08; G06N 5/04; G06N 7/005
    See application file for complete search history.

(56) References Cited

U.S. PATENT DOCUMENTS

| | | | |
|---|---|---|---|
| 7,899,764 B2 | 3/2011 | Martin et al. | |
| 9,081,817 B2 | 7/2015 | Arasu et al. | |
| 9,208,179 B1* | 12/2015 | Song | G06F 16/20 |
| 9,576,248 B2 | 2/2017 | Hurwitz | |
| 9,767,127 B2* | 9/2017 | Feldschuh | G06F 16/215 |
| 9,817,888 B2 | 11/2017 | Deshpande et al. | |
| 10,339,214 B2 | 7/2019 | Glass et al. | |
| 11,227,002 B2* | 1/2022 | Hassanzadeh | G06F 16/35 |
| 11,625,555 B1* | 4/2023 | Zhiyanov | G06F 18/24 706/20 |
| 2004/0172393 A1* | 9/2004 | Kazi | G06F 16/313 707/E17.084 |
| 2006/0149767 A1* | 7/2006 | Kindsvogel | G06F 16/2468 |
| 2008/0301113 A1* | 12/2008 | Chi | G06F 16/3325 707/999.005 |
| 2009/0228410 A1* | 9/2009 | Veeramachaneni | G06N 7/01 706/46 |
| 2015/0039611 A1* | 2/2015 | Deshpande | G06F 16/285 707/737 |
| 2016/0048770 A1* | 2/2016 | Thomas | G06F 16/215 707/706 |
| 2016/0119119 A1* | 4/2016 | Calapodescu | G06F 21/6227 380/30 |
| 2016/0357790 A1* | 12/2016 | Elkington | G06N 20/00 |
| 2017/0063794 A1* | 3/2017 | Jain | H04L 63/20 |
| 2017/0139984 A1* | 5/2017 | Bordawekar | G06N 5/02 |
| 2017/0154052 A1* | 6/2017 | Hassanzadeh | G06F 16/215 |
| 2018/0239584 A1* | 8/2018 | Khamker | G06F 16/2228 |
| 2019/0303371 A1* | 10/2019 | Rowe | G06F 16/24564 |
| 2020/0050966 A1* | 2/2020 | Enuka | G06K 9/6267 |
| 2020/0183773 A1* | 6/2020 | Brehm | G06N 3/082 |
| 2020/0387526 A1* | 12/2020 | Herron | G06F 16/288 |
| 2020/0402625 A1* | 12/2020 | Aravamudan | G06F 21/64 |
| 2020/0409936 A1* | 12/2020 | Salkola | G10L 15/22 |
| 2021/0150056 A1* | 5/2021 | Vax | G06F 16/9024 |
| 2021/0248149 A1* | 8/2021 | Somani | G06F 40/30 |
| 2021/0319026 A1* | 10/2021 | Seth | G06N 20/20 |
| 2021/0374525 A1* | 12/2021 | Bremer | G06F 18/214 |

OTHER PUBLICATIONS

Mell et al., "The NIST Definition of Cloud Computing", Recommendations of the National Institute of Standards and Technology, Special Publication 800-145, Sep. 2011, 7 pages.

* cited by examiner

FEATURE VECTOR GENERATION FOR PROBABALISTIC MATCHING

BACKGROUND

The present disclosure relates to record management and, more specifically, generating feature vectors to correlate related records.

Master Data Management (MDM) based solutions work with enterprise data, perform indexing, matching, and linking of data from different sources. Matching records from different sources can provide a more complete view of the relevant data.

SUMMARY

Disclosed is a computer-implemented method to increase the efficiency of matching records from two sources. The method includes identifying a first source and a second source wherein each of the sources include one or more records and each record includes one or more attributes. The method further includes determining, based on a corpus, the one or more attributes. The method also includes generating, based on the attributes, a set of feature vectors, wherein the set of feature vectors represent the one or more attributes. The method includes comparing each record in the first source against each record in the second source. The method further includes generating, in response to the comparing, a link confidence. The method also includes linking, in response to the link confidence being above a linking threshold, the associated records. The method includes determining a first feature vector of the set of feature vectors used in the linking, and outputting a set of results.

The present Summary is not intended to illustrate each aspect of, every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Master Data Management (MDM) based solutions work with enterprise data, perform indexing, matching, and linking of data from different sources. Matching records from different sources can provide a more complete view of the relevant data. Machine learning can be used to analyze various features of records from different sources, and output a probability that any two records from different sources represent the same entity.

In order to increase the efficiency of matching and/or linking records, embodiments of the present disclosure can automatically suggest and/or generate feature vectors for one or more attributes of the record. Additionally, embodiments of the present disclosure determine a similarity score (or similarity measure) based on the one or more feature vectors, to determine if the records should be linked.

The following acronyms may be used below:
API application program interface
ARM advanced RISC machine
CD-ROM compact disc ROM
CMS content management system
CoD capacity on demand
CPU central processing unit
CUoD capacity upgrade on demand
DPS data processing system
DVD digital versatile disk
EPROM erasable programmable read-only memory
FPGA field-programmable gate arrays
HA high availability
IaaS infrastructure as a service
I/O input/output
IPL initial program load
ISP Internet service provider
ISA instruction-set-architecture
LAN local-area network
LPAR logical partition
PaaS platform as a service
PDA personal digital assistant
PLA programmable logic arrays
RAM random access memory
RISC reduced instruction set computer
ROM read-only memory
SaaS software as a service
SLA service level agreement
SRAM static random-access memory
WAN wide-area network Cloud Computing in General It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
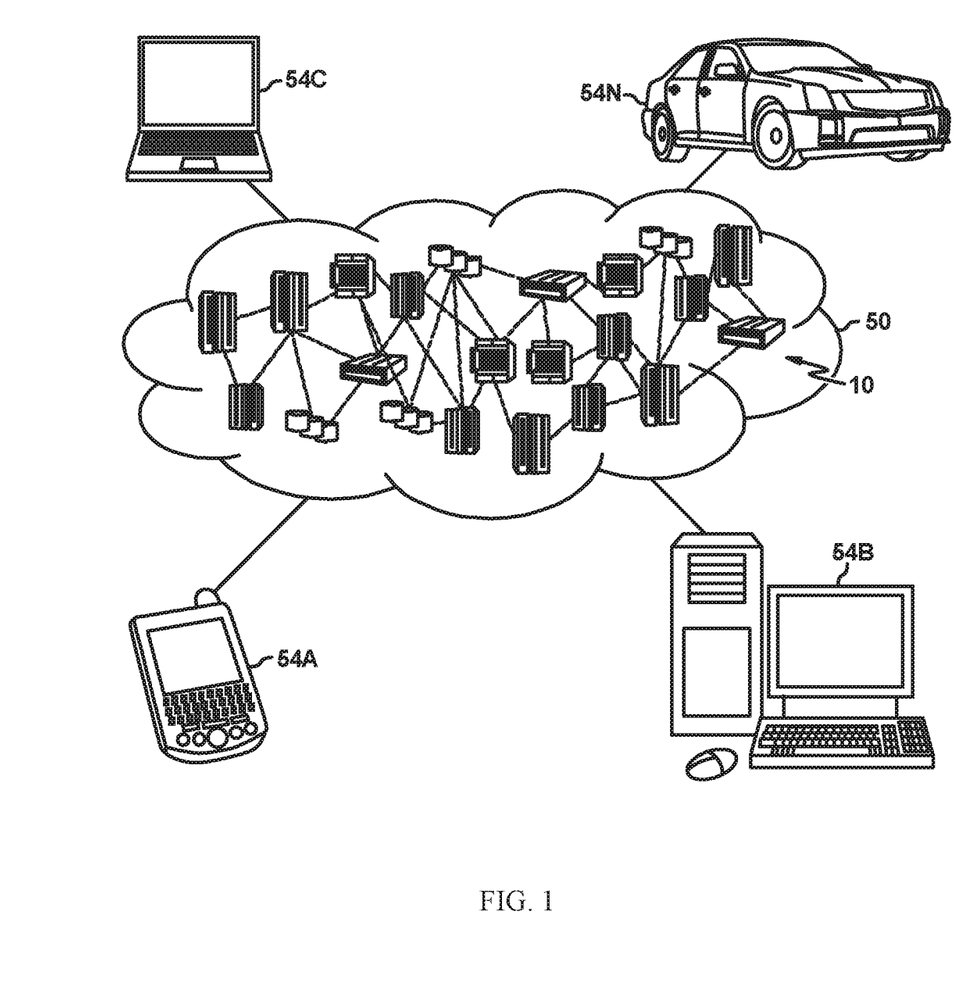
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
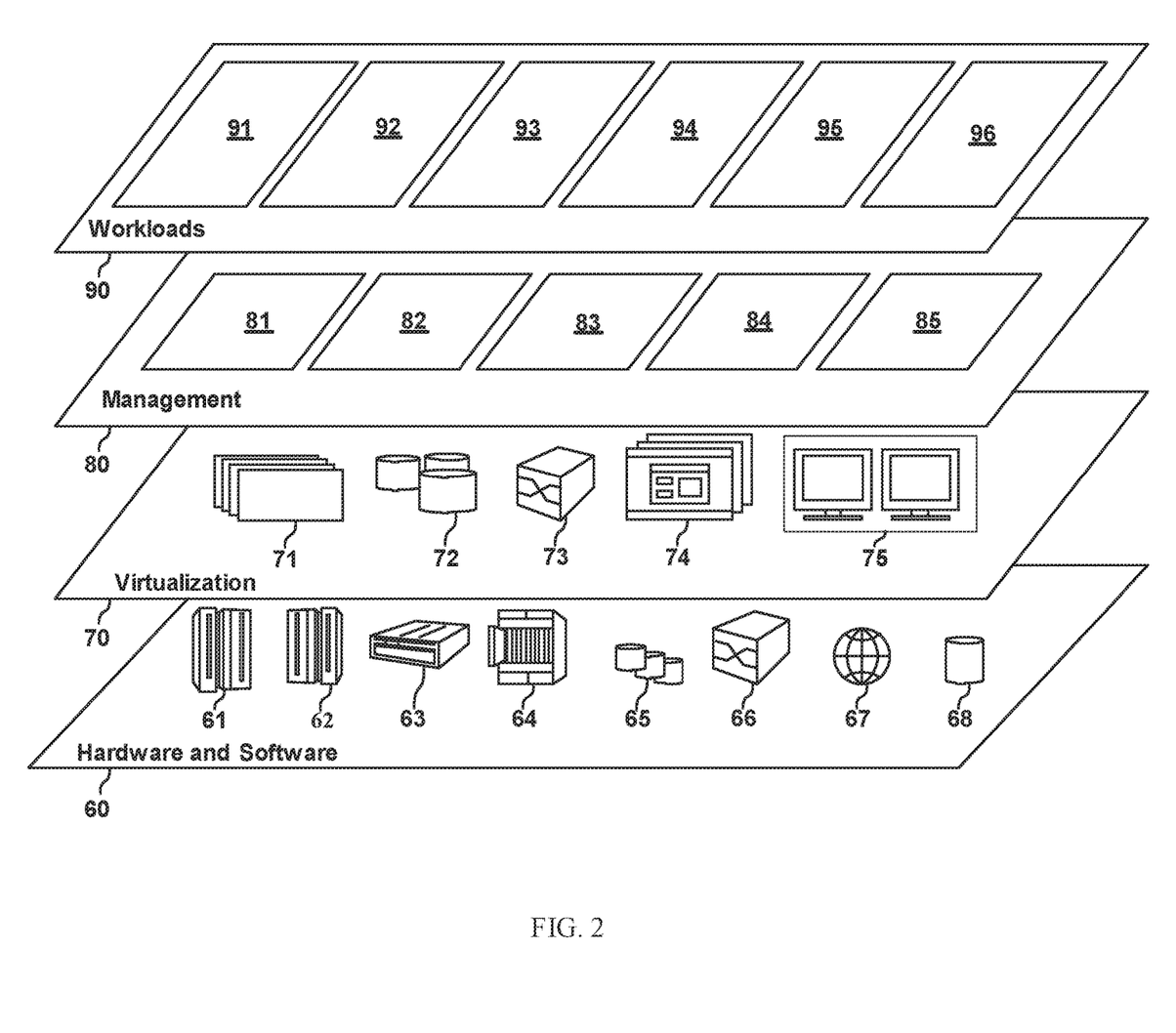
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Data Processing System in General

Figure 3:
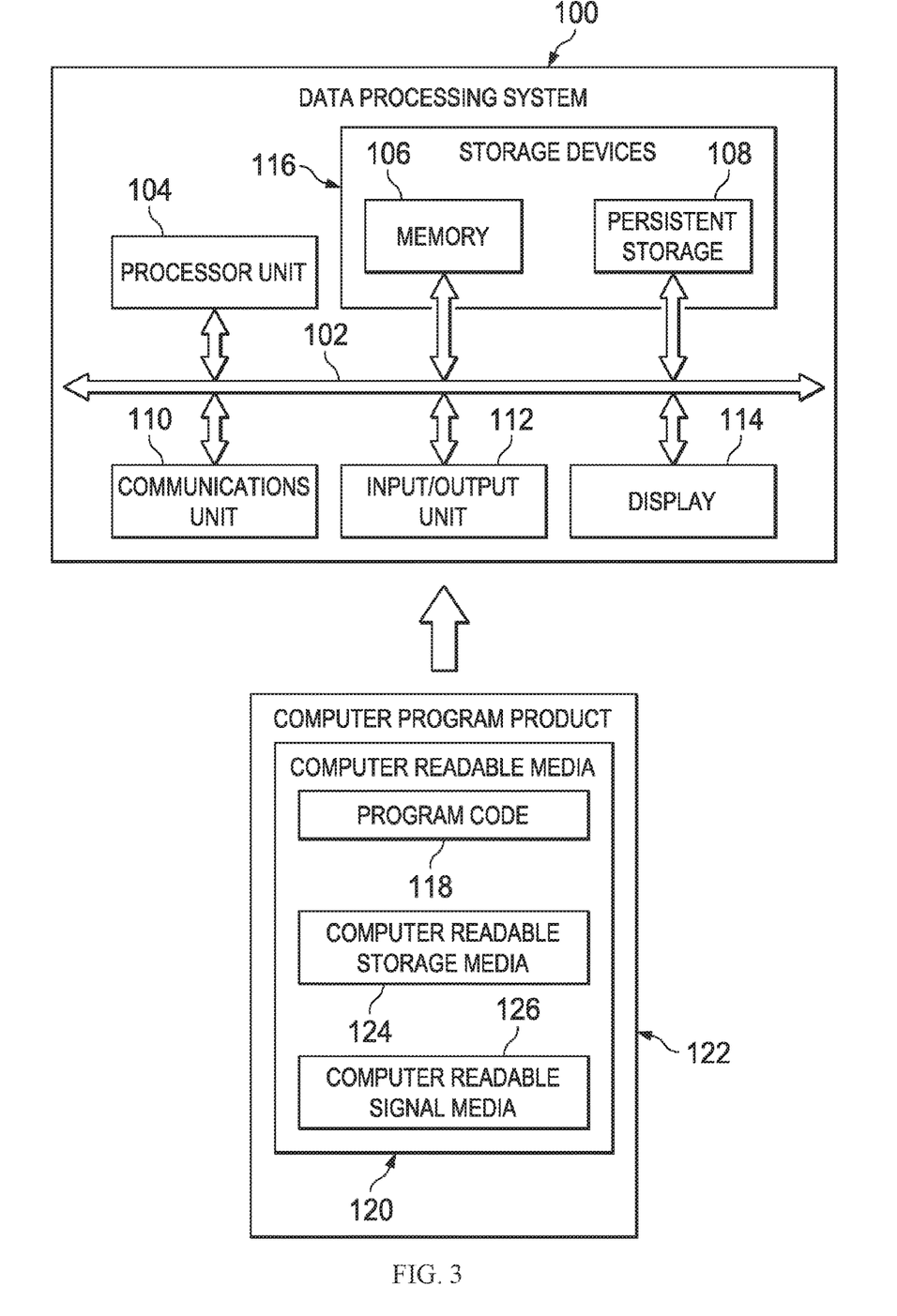
FIG. 3 is a block diagram of a DPS according to one or more embodiments disclosed herein.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/ output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100 and other components shown in FIG. 1

Master Data Management (MDM) based solutions work with enterprise data, perform indexing, matching, and linking of data from different sources. Matching records from different sources can provide a more complete view of the relevant data.

Matching/linking record pairs can include comparing different record attributes (e.g., Name, Address, Birthdate, identification number, etc.) from each various source to determine if they are related. The relation can be a common customer (e.g., individual, business, etc.) and/or a common person, a common household, and/or any other attribute. The linking of records can be based on a series of mathematically derived statistical probabilities and weight tables.

In some embodiments, a system expert can be used to configures the matching parameters. This method is time-consuming and can result in errors. In some cases, the feature vectors used to compare the records are also generated by an expert.

Embodiments of the present disclosure seek to improve the linking of records. Embodiments of the present disclosure automatically generate feature vectors that are used to compare multiple records. In some embodiments, one or more machine learning models are used to determine the features to include/compare in the new feature vector. Embodiments of the present disclosure can recommend a set of feature vectors to use in the matching process. In some embodiments, the feature vectors are based on columns (or attributes or data points or inputs) of the records being compared.

In some embodiments, an attribute comparison function checks for a variety of matching conditions including exact match, edit distance NGRAM, phonetic, and/or partial matching. Matching scores can be generated based on the values in the one or more feature vectors. The scores and sub-scores (e.g., value of each dimension in a feature vector) can be combined based on a relative weight. The relative weights can be statistically determined and/or the result of a leaning model/neural network). Based on the overall score (e.g., matching score) and using predefined thresholds within the system, pairs of records can be considered as matched, unmatched, or undetermined. The undetermined pairs can be reviewed and the results used to update the matching process.

Embodiments of the present disclosure include a data management system that can identify two sets (or sources) of records to be compared. The two sources may include entries representative of a common entity. The data management system can identify attributes related to each record. The attributes can be based on the columns or other data inputs related to each entry. In some embodiments, the data manager identifies the domain (e.g., type) of the attribute. This can include whether the attribute is phonetic or numeric. It may also include identifying a specific attribute. For example, a first attribute can be identified as phonetic and a name, a second attribute as phonetic and an address, and a third attribute as numeric and a phone number. In some embodiments, one or more knowledge corpora are used to identify the domain. The corpora can be public and/or private knowledge repositories. In some embodiments, the data manager recommends/generates one or more feature vectors to be used in the comparing.

In some embodiments, the data system compares the two data sources and links the appropriate records. The comparing can output a confidence score, which represents a likelihood two records represent the same entity (e.g., customer). The linking can be in response to a confidence score being above a predetermined threshold. In some embodiments, the data system outputs the results. The output can include which records are linked, and which records are undetermined. Additionally, the output can include a list of feature vectors that are used for comparing and/or which feature vectors and dimensions of the vectors are the biggest weight in the matching process.

The aforementioned advantages are example advantages, and embodiments exist that can contain all, some, or none of the aforementioned advantages while remaining within the spirit and scope of the present disclosure.

Figure 4:
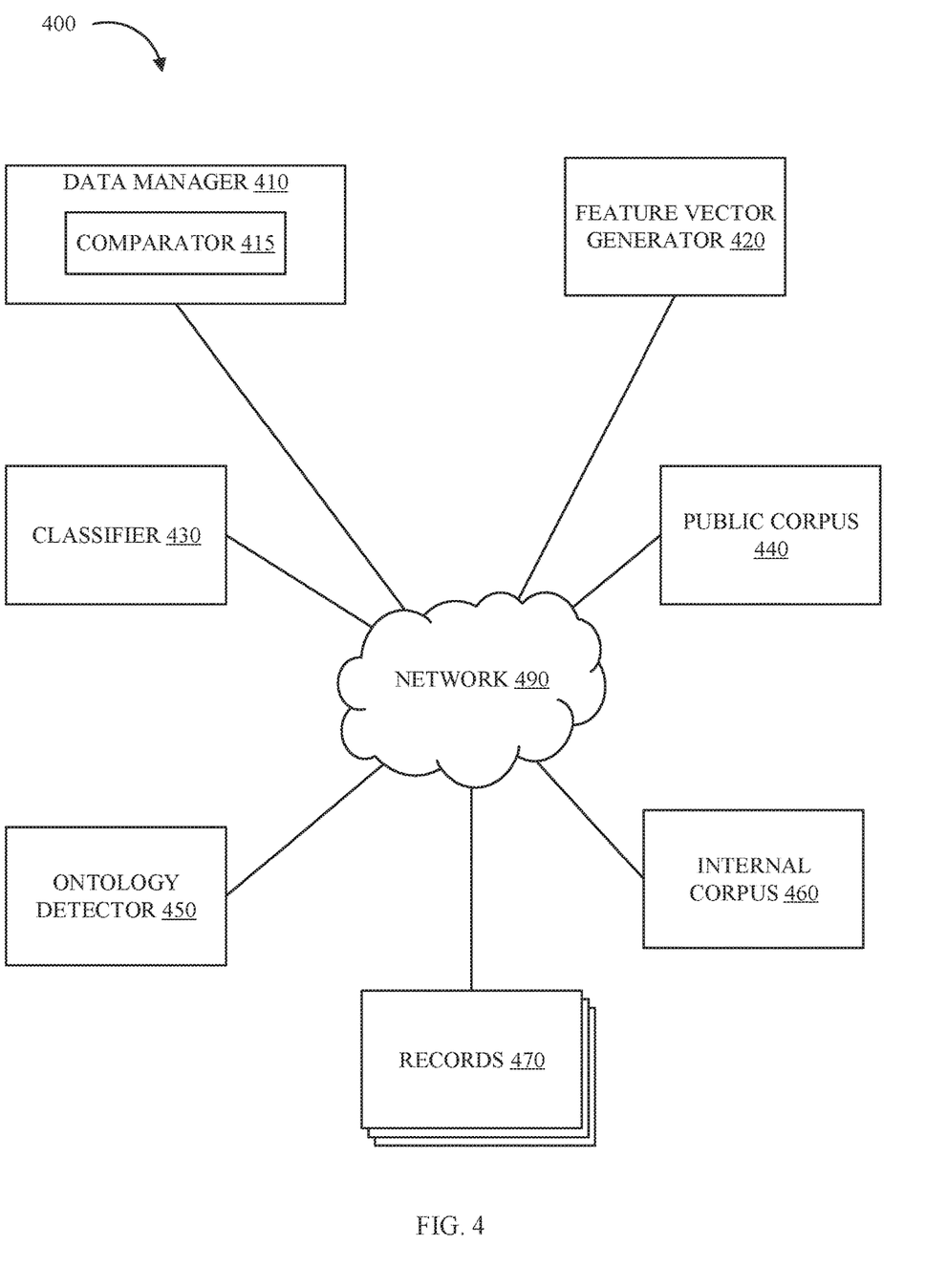
FIG. 4 illustrates a functional diagram of a computing environment suitable for operation of data manager in accordance with some embodiments of the present disclosure.

Referring now to various embodiments of the disclosure in more detail, FIG. 4 is a representation of a computing environment 400, that is capable of running a data manager (e.g., data manager 410) in accordance with one or more embodiments of the present disclosure. Many modifications to the depicted environment may be made by those skilled in the art without departing from the scope of the disclosure.

Computing environment 400 includes data manager 410, feature vector generator 420, classifier 430, public corpus 440, ontology detector 450, internal corpus 460, records 470 and network 490. Network 490 can be, for example, a telecommunications network, a local area network (LAN), a wide area network (WAN), such as the Internet, or a combination of the three, and can include wired, wireless, or fiber-optic connections. Network 490 may include one or more wired and/or wireless networks that are capable of receiving and transmitting data, voice, and/or video signals, including multimedia signals that include voice, data, and video information. In general, network 490 may be any combination of connections and protocols that will support communications between data manager 410, feature vector generator 420, classifier 430, public corpus 440, ontology detector 450, internal corpus 460, records 470, and other computing devices (not shown) within the computing environment 400.

In some embodiments data manager 410, feature vector generator 420, classifier 430, public corpus 440, ontology detector 450, internal corpus 460, records 470 may include a computer system, such as the DPS 100. In some embodiments data manager 410, feature vector generator 420, classifier 430, public corpus 440, ontology detector 450, internal corpus 460, records 470 can be combined in one or more computing devices (e.g., DPS 100) in any combination.

Data manager 410 can be a standalone computing device, a management server, a web server, a mobile computing device, or any other electronic device or computing system capable of receiving, sending, and processing data. In some embodiments, data manager 410 can represent a server computing system utilizing multiple computers as a server system, such as a cloud computing environment 50. In some embodiments, data manager 410 represents a computing system utilizing clustered computers and components (e.g., database server computers, application server computers, virtual machines, etc.) that act as a single device. In embodiments, data manager 410 can be any device or group of devices that are subject to a common throttling configuration. In some embodiments, data manager 410 includes comparator 415.

In some embodiments, data manager 410 compares records from two different sources. In some embodiments, data manager 410 can match and/or link a pair of records. The linking can be based on determining whether the two records represent a common entity (e.g., a person). In some embodiments, data manager 410 calculates/determines a likelihood and/or a probability two records represent the same person. The records can be linked if the probability exceeds a predetermined threshold. In some embodiments, the comparing is based on one or more feature vectors for the records. In some embodiments, the comparing is performed by comparator 415.

Comparator 415 can be any combination of hardware and/or software configured to compare two or more records. In some embodiments, the comparing includes determining the records are related to the same entity (e.g., customer, person, etc.). In some embodiments, the compared records are from two or more different sources. Different sources can include different databases, different tables within a database. The sources can be collected/controlled by one entity (e.g., two departments of a corporation) or multiple entities (e.g., two different corporations). In some embodiments, comparator 415 evaluates the one or more feature vectors for a pair of records. In some embodiments, comparator 415 generates a comparison score.

In some embodiments, comparator 415 includes one or more machine learning models (learning models). In some embodiments, there is a learning model for each category/type of data. For example, one learning model can determine the similarity between names, a second learning model trained to compare birthdays, and a third to compare addresses. In some embodiments, the learning models can output a score. The score can be a distance rating. The distance rating can represent the similarity and/or differences of an attribute in the pair of records.

Feature vector generator 420 can be any combination of hardware and/or software configured to generate feature vectors used for matching. In some embodiments, generating the feature vectors includes identifying the feature vectors used for matching. In some embodiments, a feature vector is a representation of the comparison details of the two values of a pair of records. Each feature vector can include any number of dimensions. In some embodiments, the feature vectors are based on the attributes in the records. Each attribute may be represented by one or more feature vectors. Some non-limiting examples of attributes includes name, identifier (e.g., driver's license number, customer number, account number, etc.), gender date, email address, phone, and address.

In some embodiments, each attribute is considered a text/phonetic (e.g., name) attribute, or a numeric/identifier attribute. Text attributes can be based on relative use (in general or in the dataset), phonetic equivalences, edit distance and other similar factors. Numeric feature vectors can be based on number comparison, edit distance, and/or other similar factors.

In some embodiments, feature vector generator 420 includes a feature vector mapper. In some embodiments, the feature vector mapper identifies and gathers attribute details. This can include identifying a domain and/or a class of each attribute of the relevant records (e.g., name, address, locations, sales data, identification number, etc.).

Classifier 430 can be any combination of hardware and/or software configured to classify data. In some embodiments, classifier determines a category for each attribute. In some embodiments, the classifier 430 differentiates numeric attributes from text attributes. In some embodiments, the classifier 430 defines attribute type (or category). Some examples of categories can include name, address, phone number, birthdate, and other similar categories. The classification can be based on one or more knowledge corpora (e.g., public corpus 440, internal corpus 460).

Public corpus 440 can be a data source that is generally available. In some embodiments, public corpus 440 can be any combination of databases, websites, libraries, collections, social media, and the like. In some embodiments, data obtained from public corpus 440 can be used to classify attributes for feature vectors.

Ontology detector 450 can be any combination of hardware and/or software configured to identify characteristics of a feature. In some embodiments, ontology detection assigns/determines a category for each record entry (e.g., column, attribute). The record entry can be each column or a set of related columns. For example, address data can be kept in one column or in several columns, where the street number, street name, and zip code, as a non-limiting example, can be stored in different columns.

In some embodiments, ontology detector 450 can identify a language associated with each record. In some embodiments, the language can be associated with a culture and/or region of origin. This can include identifying region-specific regulations (e.g., general data protection, General Data Protection Regulation (GDPR) (European Union 2016/679), consumer privacy laws, etc.).

Internal corpus 460 can be any private data source. In some embodiments, internal corpus 460 is consistent with public corpus 440, except access to the data is restricted. In some embodiments, internal corpus 460 includes ontology data. The ontology data can be manually entered. The data can be previous results produced by data manager 410, feature vector generator 420, and/or the other components of the computing environment 400.

Records 470 can be any combination of hardware and/or software configured to store data. In some embodiments, records 470 includes one or more databases that can be part of a federated database system. In some embodiments, records 470 includes two or more sources of data. In some embodiments, the two or more sources can be any data that can be compared against each other.

In some embodiments, records 470 includes two or more different sources. The source can be a different table, a different database, and/or any other different storage method. In some embodiments, each record from a first source (e.g., database) is compared against each record from a second source.

Figure 5:
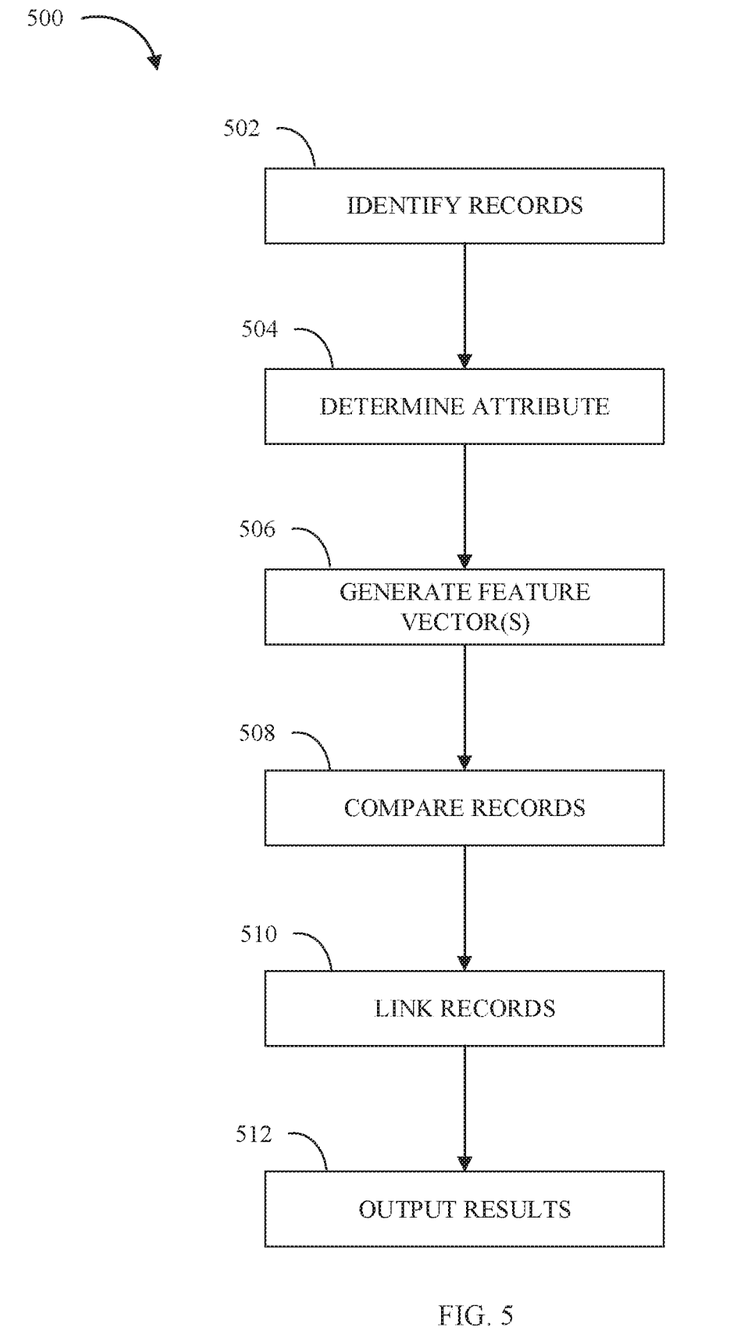
FIG. 5 illustrates a flow chart of an example method to improve record matching from different sources in accordance with some embodiments of the present disclosure.

FIG. 5 depicts a flowchart of an example method, method 500, for improving I/O performance, that can be performed in a computing environment (e.g., computing environment 400 and/or cloud computing environment 50). One or more of the advantages and improvements described above for generating and monitoring usage patterns may be realized by method 500, consistent with various embodiments of the present disclosure.

Method 500 can be implemented by one or more processors, the computing environment 400, cloud computing environment 50, and/or a different combination of hardware and/or software. In various embodiments, the various operations of method 500 are performed by one or more of data managers 410, feature vector generator 420, classifier 430, public corpus 440, ontology detector 450, internal corpus 460, and records 470. Method 500 can evaluate each record in a first source against each record in a second source. However, only one iteration of the method will be described below.

At operation 502, data manager 410 identifies records to compare. In some embodiments, the records are included in records 470. In some embodiments, identifying the records includes determining two sources of the records. Each source can have a plurality of entries (e.g., rows) that include one or more attributes (e.g., column).

At operation 504, data manager 410 identifies attributes associated with the records. The attributes can be based on entries (columns) in the records. In some embodiments, identifying the attributes includes classifying the entries. The classification can be performed by one or more learning models. In some embodiments, operation 504 includes the comparing attribute data against one or more corpora. The corpora can be publicly available (e.g., public corpus 440) and/or private/secure (e.g., internal corpus 460). In some embodiments, identifying attributes can include identifying common attributes. A common attribute is an attribute that is present is both records being compared. It is possible that two sources have different data point in each table.

In some embodiments, operation 504 includes mapping the attributes (or features). In some embodiments, the features are mapped by feature vector generator 420.

At operation 506, data manager 410 generates one or more feature vectors. In some embodiments, the feature vectors are generated by feature vector generator 420. In some embodiments, a feature vector is generated for each attribute in the record. In some embodiments, operation 504 includes suggesting one or more feature vectors. The feature vectors can be used in the matching process. In some embodiments, each feature vector includes one or more dimensions. Each dimension can be reduced to a numerical representation of the attributes. The numerical representation can represent how similar/different of the dimension for the pair of records.

In some embodiments, operation 506 includes identifying (or marking/recording) the feature vectors used in the matching process. This can include the weight of each feature vector and the dimensions and/or relative weight of each dimension of the feature vectors.

At operation 508, data manager 410 compares records. In some embodiments, the comparing is based on the feature vectors. In some embodiments, the comparing includes calculating a confidence score (or comparison score). The confidence score can represent a likelihood that two records from the different sources are representing a common entity (e.g., customer).

At operation 510, data manager 410 links records. In some embodiments, the linking is in response to the confidence score being above a predetermined threshold. The threshold can be updated automatically and/or manually by a user. In some embodiments, the linking includes marking/storing, in one or both records, an indicator of the linked record.

At operation 512, data manager 410 outputs results. In some embodiments, the results can include the number of records that were linked, including an identifier to each record from each source. The results can also include an indication of which feature vectors were the most used (or have the highest weight) in the linking process. This can also include data about each dimension of each feature vector. In some embodiments, operation 512 includes displaying, on one or more network devices, the results. In some embodiments, the results are based on the matching process. Each set of records that are matched can be displayed. In some embodiments, a entity profile (e.g., customer profile, customer preferences, etc.) are updated in response to the matching.

In some embodiments, the output includes indeterminate results. An indeterminate result is a record that may have a matching record in the other source, but there is a flag. In some embodiments, the flag can be in response to a difference confidence score falling below a predetermined threshold. This threshold indicates a confidence that the records are not directed to a common entity. In some embodiments, the flag is in response to the linking confidence score being above a second confidence but below the linking confidence. This can indicate there is some likelihood the records match, but they should be re-evaluated. The re-evaluation can be by a user and/or on a subsequent matching. In some embodiments, the flag can be in response to a record having a confidence score above the linking threshold for two or more records.

In some embodiments, the results can be displayed to a user. In some embodiments, the results are used to update/retrain the one or more learning models and/or feature vector generator 420.

Computer Technology and Computer Readable Media

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
identifying a first source and a second source wherein the first source and the second source include a plurality of records and each record includes two or more attributes;
determining, based on a corpus, the two or more attributes for each record of the plurality of records;
generating, for each of the attributes, a set of feature vectors for each record, wherein the set of feature vectors represent the one or more attributes, the set of feature vectors includes at least two feature vectors, and at least one feature vector of the set of feature vectors includes two or more dimensions;
comparing the generated feature vectors for each record in the first source against each record in the second source;
generating, in response to the comparing, a link confidence for each of a pair of records of the plurality of records;
linking, in response to the link confidence being above a linking threshold, a first record from the first source and a second record from the second source;
determining a first feature vector of the set of feature vectors used in the linking, wherein the first feature vector had a highest weighting in the linking of the first record and the second record;
outputting a set of results, wherein the set of results includes the first feature vector and a relative weight of each attribute of the first feature vector and the two or more dimensions of the at least one attribute; and
retraining, based on the determining the first feature vector is used in the linking and the set of results, a learning model configured to link records, wherein the retraining is configured to improve a linking of records.

2. The method of claim 1, wherein the link confidence represents a likelihood a first record from the first source and a second record from the second source represent a common entity.

3. The method of claim 1, wherein the corpus is an internal corpus.

4. The method of claim 3, wherein determining the one or more attributes is based on a second corpus and the second corpus is a public corpus.

5. The method of claim 1, wherein the one or more attributes are selected from the group consisting of: a name, an address, a gender, an email address, a phone number, and an identification number.

6. The method of claim 1 further comprising:
classifying each attribute of the one or more attributes.

7. The method of claim 1, further comprising:
identifying, for at least one attribute of the one or more attributes, a language associated with the attribute.

8. The method of claim 1, further comprising:
identifying, for at least one attribute of the one or more attributes, a regulation associated with the attribute.

9. The method of claim 8, wherein the at least one attribute includes a location, and wherein the identifying the regulation is based on the location.

10. The method of claim 9, wherein the regulation is a data protection regulation.

11. A system configured to link records comprising:
a processor; and
a computer-readable storage medium communicatively coupled to the processor and storing program instructions which, when executed by the processor, are configured to cause the processor to:
identify a first source and a second source wherein the first source and the second source include a plurality of records and each record includes two or more attributes;
determine, based on a corpus, the two or more attributes for each record of the plurality of records;
generate, for each of the attributes, a set of feature vectors for each record, wherein the set of feature vectors represent the one or more attributes, the set of feature vectors includes at least two feature vectors, and at least one feature vector of the set of feature vectors includes two or more dimensions;
compare the generated feature vectors for each record in the first source against each record in the second source;
generate, in response to the comparing, a link confidence for each of a pair of records of the plurality of records;
link, in response to the link confidence being above a linking threshold, a first record from the first source and a second record from the second source;
determine a first feature vector of the set of feature vectors used in the linking, wherein the first feature vector had a highest weighting in the linking of the first record and the second record;
output a set of results, wherein the set of results includes the first feature vector and a relative weight of each attribute of the first feature vector and the two or more dimensions of the at least one attribute; and
retrain, based on the determining the first feature vector is used in the linking and the set of results, a learning model configured to link records, wherein the retraining is configured to improve a linking of records.

12. The system of claim 11, wherein the link confidence represents a likelihood a first record from the first source and a second record from the second source represent a common entity.

13. The system of claim 11, wherein the corpus is an internal corpus.

14. The system of claim 13, wherein the determination of the one or more attributes is based on a second corpus and the second corpus is a public corpus.

15. The system of claim 11, wherein the program instructions further configured to cause the processor to:
classify each attribute of the one or more attributes.

16. A computer program product, the computer program product comprising a computer readable storage medium having program instructions embodied therewith, the program instructions executable by a processing unit to cause the processing unit to:
identify a first source and a second source wherein the first source and the second source include a plurality of records and each record includes two or more attributes;
determine, based on a corpus, the two or more attributes for each of a pair of records of the plurality of records;
generate, for each of the attributes, a set of feature vectors for each record, wherein the set of feature vectors represent the one or more attributes, the set of feature vectors includes at least two feature vectors, and at least one feature vector of the set of feature vectors includes two or more dimensions;
compare the generated feature vectors for each record in the first source against each record in the second source;
generate, in response to the comparing, a link confidence for each pair of records;
link, in response to the link confidence being above a linking threshold, a first record from the first source and a second record from the second source;
determine a first feature vector of the set of feature vectors used in the linking, wherein the first feature vector had a highest weighting in the linking of the first record and the second record;
output a set of results, wherein the set of results includes the first feature vector and a relative weight of each attribute of the first feature vector and the two or more dimensions of the at least one attribute; and
retrain, based on the determining the first feature vector is used in the linking and the set of results, a learning model configured to link records, wherein the retraining is configured to improve a linking of records.

17. The computer program product of claim 16, wherein the confidence represents a likelihood a first record from the first source and a second record from the second source represent a common entity.

18. The computer program product of claim 16, wherein the corpus is an internal corpus.

19. The computer program product of claim 18, wherein the determination of the one or more attributes is based on a second corpus and the second corpus is a public corpus.

20. The computer program product of claim 16, wherein the program instructions further cause the processing unit to:
classify each attribute of the one or more attributes.

* * * * *